United States Patent [19]
Meyer et al.

[11] 3,809,958
[45] May 7, 1974

[54] DIRECT CURRENT ELECTROMAGNETIC SWITCH

[75] Inventors: Charles F. Meyer; Kenneth W. Retzer, both of Wauwatosa, Wis.

[73] Assignee: Square D Company, Park Ridge, Ill.

[22] Filed: Nov. 6, 1972

[21] Appl. No.: 304,166

[52] U.S. Cl.............. 317/11 E, 317/58, 317/151, 317/154, 338/308
[51] Int. Cl. ............................................. H02h 7/22
[58] Field of Search............ 317/11 E, 151, 58, 154, 317/DIG. 6, 33 C; 338/308

[56] References Cited
UNITED STATES PATENTS

| | | | |
|---|---|---|---|
| 3,181,039 | 4/1965 | Binder et al. | 317/154 |
| 3,274,359 | 9/1966 | Riebs | 338/308 X |
| 3,501,723 | 3/1970 | Marien | 335/202 |
| 3,501,717 | 3/1970 | Schubring et al. | 335/198 |
| 3,084,310 | 4/1963 | Schurr | 317/154 |

OTHER PUBLICATIONS

Packard, Relay Engineering, Feb. 14, 1946, pp. 297–298.

Primary Examiner—James D. Trammell
Attorney, Agent, or Firm—William H. Schmeling; Harold J. Rathbun

[57] ABSTRACT

An electromagnetically operated device having an alternating current magnet structure operated by direct current. The electromagnet includes a laminated magnet iron armature, a laminated magnet iron stationary magnet, and a coil winding which is positioned to induce a magnet flux in the armature and the magnet which causes the armature to be picked up and move from a position where it is spaced from the magnet to a sealed position where it engages the magnet when the coil is energized from a direct current source by a pick-up current. A pair of closed contacts which open as the armature moves toward the sealed position, cause a resistor to be included in the coil circuit to reduce the current flow through the coil when the armature is in the sealed position. The resistor, which is of the thick film type, is mounted between the rear side of the device and a panel on which the device is mounted so the panel aids in dissipating heat generated in the resistor when the coil is energized. A capacitor in a control circuit for the device is charged by the pick-up current and supplies current energy to the coil when the contacts initially open to assure movement of the armature to the sealed position.

10 Claims, 5 Drawing Figures

DIRECT CURRENT ELECTROMAGNETIC SWITCH

This invention relates to electromagnetically operated devices and is more particularly concerned with a device having an alternating current magnet structure that is energized by direct current.

Conventionally, electromagnets for switching devices are designed specifically to be energized by direct current or alternating current and because of the differences in construction of the two types of electromagnets, they are not usually interchangeable in switching units. This difference in electrical characteristics and physical construction of alternating current and direct current electromagnets requires that manufacturers and distributors of electromagnetic devices manufacture and stock a dual line of products for applications that otherwise have the same requirements with the exception that they are to be used in an alternating current or a direct current system. This problem is not objectionable when a large number of both types of devices are required by the marketplace. However, when the demands of the marketplace dictate that the number of required alternating current devices greatly exceeds requirements of the direct current type devices, the difference in the unit costs of the two types of devices becomes substantial. The present invention is directed to reduce the difference in cost between a mass production alternating current electromagnetically operated device and a low volume produced direct current electromagnetically operated device.

It is an object of the present invention to provide a replacement for the coil in an alternating current type electromagnetically operated device which will permit the device to be used in direct current installations.

Another object is to provide a coil and a circuit controlling the energization of the coil from a direct current source which will permit the coil to be used in an electromagnet that has its magnet iron components designed for use in alternating current circuits.

A further object is to provide an alternating current type electromagnetically operated device with a coil and a control circuit for the coil which will reduce the current energy input to the coil when the armature is in a sealed position with the magnet so the device may be used in direct current systems.

An additional object is to provide a replacement coil assembly for the coil of an A.C. relay so the relay may be used in D.C. circuits with the assembly including a control circuit that is switched by a normally closed contact of the relay to include a resistor in circuit with the coil when the coil is energized by D.C. current and the relay armature moves toward a sealed position with the stationary magnet of the relay and to provide a mounting for the resistor which positions the resistor between a base of the relay and a mounting panel for the relay so the panel aids in dissipating heat generated in the resistor when the coil is energized with said control circuit including a capacitor which is charged during the period when the contacts are closed and the coil is initially energized and provides the coil with current energy when the contacts initially open to assure movement of the armature to the sealed position with the stationary magnet.

Further objects and features of the invention will be readily apparent to those skilled in the art from the following specification and from the appended drawings illustrating certain preferred embodiments in which.

Figure 1:
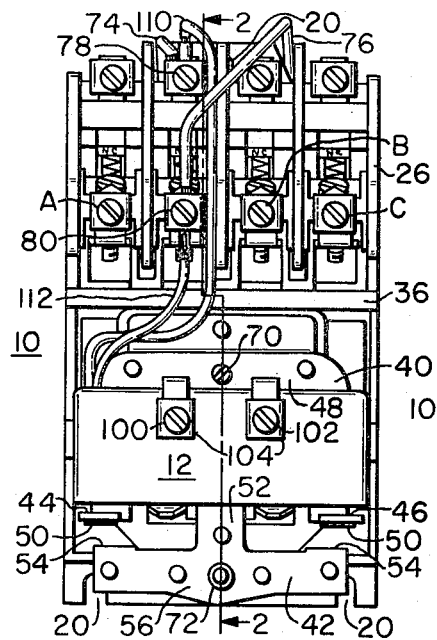
FIG. 1 is a front view in elevation of an electromagnetic switch including a coil assembly according to the present invention.
Figure 2:
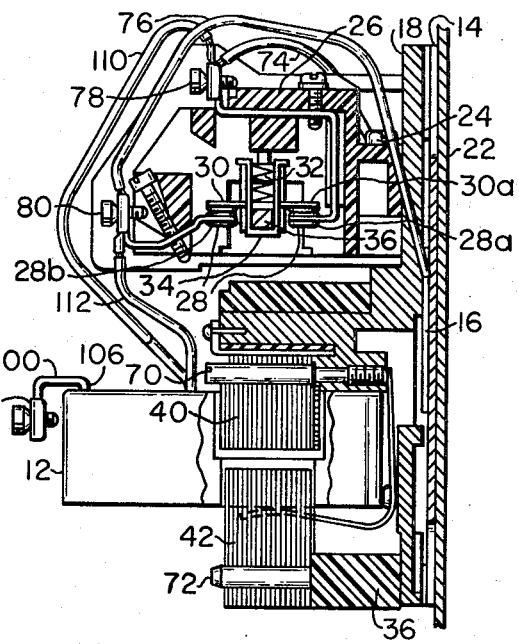
FIG. 2 is a cross-sectional view taken along line 2—2 in FIG. 1.

An electromagnet switch 10, as shown in the drawings, is identical with an electromagnetic switch as disclosed in U.S. Pat. No. 3,501,723, which was granted to Kenneth J. Marien on Mar. 17, 1970 and assigned to the assignee of the present invention with the exception that the coil for the electromagnet in the switch shown in the Marien patent is replaced by a coil assembly 12 in the switch 10, a plate 14 supporting a thick film type resistor 16 is attached at a rear side of a base 18 of the switch 10, and the shape of one of the movable contacts is modified to provide an overlapping contact function relative to the remaining contacts of the switch.

As the constructional details of the switch 10 are fully disclosed in the Marien patent, only a brief description necessary to understand the present invention will be set forth herein, it being understood that the invention disclosed herein may be used with electromagnetic devices other than shown in the Marien patent. The base 18 is formed as a unitary part of die cast metal material and has openings 20 which receive screws for mounting the switch 10 on a panel 22. Positioned at a top portion of the base 18 by suitable screws 24 is an insulating support 26 carrying spaced pairs of stationary contacts each designated by a numeral 28. The respective pairs of stationary contacts 28 are located to be bridged by individual movable contacts 30 which are resiliently supported by springs 32 and movable contact retainers 34 on a movable contact carrier 36. The structure of the support 26, the stationary contacts 28, the movable contacts 30, and the retainers 34, is more fully disclosed and described in U.S. Pat. No. 3,501,717, which was granted to the inventors Allin W. Schubring and Kenneth L. Paape on Mar. 17, 1970 and assigned to the assignee of the present invention.

An electromagnet assembly, which when energized causes the movable contact carrier 36 to move upwardly on the base 18, includes a stationary magnet part 40, a movable magnet part or armature 42, and the coil assembly 12. The magnet 40 includes a stack of E-shaped magnet iron parts which are laminated upon each other and tightly held assembled between a pair of non-magnetic E-shaped side plates by rivets. The magnet 40 has a pair of arms 44 and 46 extending downwardly from opposite ends of a body portion 48 with a central leg, not shown, extending from the body portion so that the arms 44 and 46 are spaced on opposite sides of the central leg. The arms 44 and 46 have flat downwardly facing pole faces 50 at their free ends.

The armature 42 is formed of a stack of T-shaped laminated magnet iron parts which are tightly held assembled by rivets. The armature 42 has a central leg 52 and flat upwardly facing pole faces 54 on the opposite ends of a body portion 56.

Figure 5:
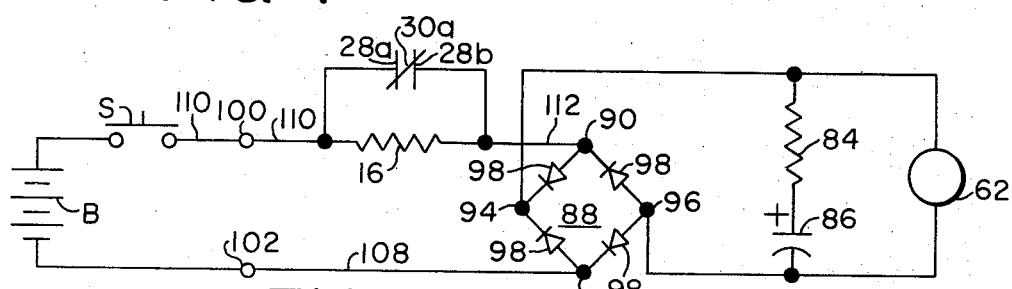
FIG. 5 is a schematic diagram of a circuit controlling the energization of a coil winding according to the present invention.

The coil assembly 12 includes a molded shell 58 having a cavity 60 extending from an open top end. A coil winding 62 surrounds a projection 64 that extends upwardly in the cavity 60 from the bottom side of the shell 58. The projection 64 has a rectangular opening 66 which receives the central leg of the magnet 40 while the arms 44 and 46 extend along the opposite sides of the shell 58 so that portions of the coil winding 62 are located between the central leg, on the magnet 40, and the arms 44 and 46. Also included within the cavity 60 is a printed circuit board 68 which positions the components of the circuit shown in FIG. 5 with the exception of the resistor 16 and the contacts which are in parallel with the resistor 16. The cavity 60 is filled with a suitable epoxy type encapsulating material after the coil 62 and board 68 are positioned and interwired in the cavity 60. The coil assembly 12, the magnet 40, and the armature 42 are assembled in the switch 10 in a manner described in the Marien patent. During assembly of the electromagnet, the magnet 40 is positioned so its central leg is received in the opening 66 from the top side of the coil assembly 12 and the armature 42 is positioned so its central leg 52 extends in the opening 66 from the bottom side of the coil assembly 12 while the electromagnet assembly is detached from the base 18. The electromagnet assembly is then positioned on the base 18 to have a mounting screw 70 extending through a bore in the body portion 48 aligned with the threaded opening in the base 18 and a bore in the body portion 56 aligned to receive a pin 72 that extends from the movable contact carrier 36. The electromagnet assembly is maintained in its position by tightening the screw 70. The removal of the electromagnet assembly is accomplished by merely loosening the screw 70 and lifting the electromagnet assembly from its position on the base 18.

The thick film resistor 16 is formed as a rectangular wafer and is secured to the front side of the plate 14 by a suitable adhesive. The resistor 16 has a pair of leads 74 and 76 extending upwardly which are connected to terminals 78 and 80 respectively on the support 26. The plate 14 has a pair of countersunk openings 82 receiving screws, not shown, which secure the plate 14 to the rear side of the base 18 with the resistor 16 positioned between the rear side of the base 18 and front side of the plate 14 in intimate heat-conducting relation with the plate 14. Preferably, the impedance of the resistor 16 is selected to correspond with the voltage of the direct current source and, in the embodiment shown, the resistor 16 has an impedance of 30 ohms and a power level capability of approximately 20 watts when used with a 24 volt source.

Figure 4:
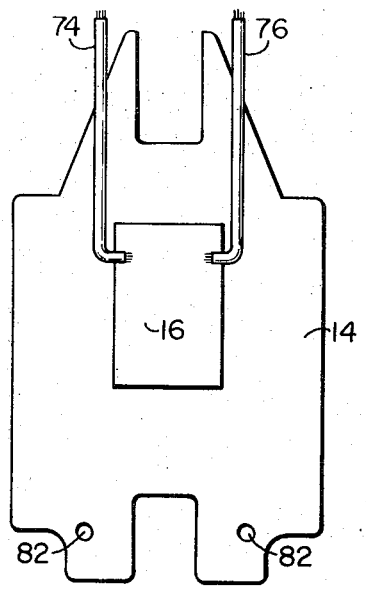
FIG. 4 is a plan view of an assembly including a resistor and plate which is used in the switch in FIG. 1.
Figure 3:
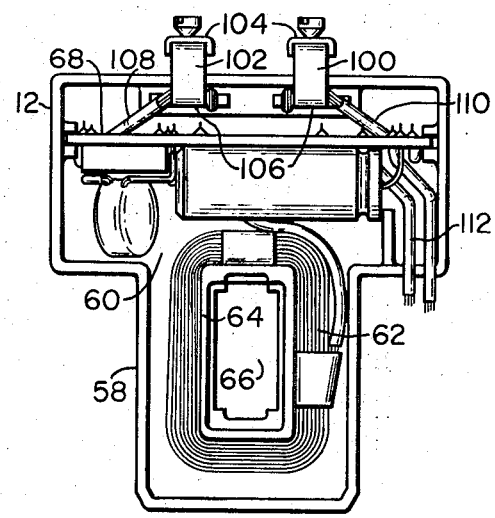
FIG. 3 is a top view of a coil as used in the coil assembly in the switch in FIG. 1 before encapsulation.

The circuit which is mounted on the board 68 and encapsulated in the shell 56, as shown in FIG. 4, includes a resistor 84, a capacitor 86 and a full wave rectifying bridge 88. The bridge 88 has a pair of input terminals 90 and 92, a pair of output terminals 94 and 96 and diodes 98, which are polarized so the terminal 94 is positive in polarity. The coil assembly 12 includes a pair of terminals 100 and 102. The terminals 100 and 102 have wire clamping portions 104 externally accessible at the top-front edge of the shell 58 and portions 106 extending into the cavity 60, which are secured by the encapsulating material. The terminal 102 is connected by a lead 108 to the input terminal 92. The lead 108 is encapsulated within the shell 58. The terminal 100 is connected by an external lead 110 to the terminal 78. The terminal 78 is one of the terminals on the support 26 and is connected to the resistor lead 74 and an individual one of selected pair of stationary contacts 28. The contact of the selected pair of contacts to which terminal 78 is connected is designated by the numeral 28a. The terminal 80 on the support 26 is connected to the resistor lead 76 and to the other individual one of the selected pair of stationary contacts 28. The contact to which the terminal 80 is connected is designated as contact 28b. The terminal 80 is also connected by an external lead 112 to the input terminal 90. The coil winding 62 is connected between the output terminals 94 and 96 and the series connected resistor 84 and capacitor 86 are connected in a circuit parallel with the coil winding 62 between the output terminals 94 and 96.

The switch 10 is a gravity drop-out type and when the switch 10 is mounted on the panel 22 and the coil 62 is de-energized, gravity will cause the armature 42 and the contact carrier 36 to be moved downwardly to a dropped-out position where the pole faces 54 are spaced from the pole faces 50. A movable contact 30a carried by the carrier 36 engages and bridges the contacts 28a and 28b when the carrier 36 is at the dropped-out position. The remaining switching contacts of the switch 10, designated by letters A, B and C in FIG. 1, may be either in a circuit opening or a circuit closing position as they are constructed to be convertible in a manner disclosed in the Schubring et al patent, supra. The movable contact 30a is designed to provide a contact overlapping function relative to the switching contacts A, B and C; that is, the movable contact 30a will be out of engagement with the contacts 28a and 28b after any switching contact A, B or C which is normally closed is opened, and any switching contact A, B or C which is normally open is closed in response to an upward movement of the carrier 36.

For purposes of illustration, a direct current source, represented by a battery B, is connected through a normally open switch S to the terminals 100 and 102.

When the switch S is initially closed, current will flow from the battery B through the closed switch contacts S and the bridged switch contacts 28a and 28b to the input terminals 90 and 92 and cause a direct current potential to be present at the output terminals 94 and 96, which is substantially equal to the potential of the battery B. The potential between terminals 94 and 96 causes the capacitor 86 to charge through the resistor 84 in the direction making the resistor 84 side of the capacitor 86 positive in polarity and the coil 62 to be energized. The energized coil 62 induces a flux in the magnet 40 and the armature 42 which causes the armature 42 to move upwardly from its dropped-out position toward a sealed position with the magnet 40. The upward movement of the armature 42 causes the movable contact carrier 36 to move upwardly. During the movement of the carrier 36, the normally closed contacts A, B or C will open and the normally open contacts A, B and C will close before the movable contact 30a moves out of its bridging engagement with the contacts 28a and 28b and the capacitor 86 will be charged with a potential substantially equal to the potential of the battery B. Just prior to the movement of the armature 42 and the movable contact carrier 36 to the sealed position where the pole faces 54 on the armature 42 engage the pole faces 50 on the magnet 40, the movable contact 30a will move out of its bridging engagement with the contacts 28a and 28b so that the resistor 16 is included in the circuit. The opening of the circuit between contacts 28a and 28b will cause the energy which was previously stored across the capacitor 86 to be delivered through the resistor 84 to the coil 62 to provide current energy which will cause the armature 42 to continue its movement to the sealed position. It is well known that the current required to cause an armature of an electromagnet to move from its dropped-out position greatly exceeds the current requirements necessary to maintain armature of the electromagnet in its sealed position. Therefore, after the armature 42 is in the sealed position, the resistor 16 will cause the current flow through the coil 62 to be reduced to a value which will permit the armature 42 to be maintained in its sealed position without causing the coil 62 to be overheated by the excess current which would otherwise destroy the coil 62 if the coil 62 was continuously energized with current having the magnitude which caused the armature 42 to move from the dropped-out position. During sealed conditions of the armature, the heat generated in the resistor 16 by current flowing through the resistor 16 is transmitted through the plate 14 to the panel 22. The panel 22 has ample thermal capacity to absorb the heat and thus aids in dissipating heat generated in the resistor 16 while it is limiting the current flow through the coil 62 to a value which will prevent the coil 62 from being damaged.

Fow lower voltage systems, size and cost considerations dictate that the capacitor 86 be of the electrolytic type. It is well known that the electrolytic capacitors are polarity sensitive and can be damaged when subjected to a reverse polarity. The full wave bridge rectifier is included in the circuit to make the circuit independent of the polarity of the direct current source connected to the terminals 100 and 102 and permits the circuit to be used with an alternating current source when desired. As described, the capacitor 86 supplies current energy to the coil 62 when the circuit through the contacts 28a and 28b is initially opened so that a critical adjustment of the movable contact 30a is not required to assure successful operation of the switch 10.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What we claim is:

1. In a direct current electromagnetically operated device, the combination comprising: a metal support having a rear side and a front side, an electromagnet positioned on the front side of the support, said electromagnet including a laminated magnet iron magnet, a laminated magnet iron armature and a coil winding positioned on the magnet to induce a magnet flux in the magnet and the armature for causing the armature to move from a first position where the armature is spaced from the magnet to a second position where the armature engages the magnet when the coil is energized by direct current having a predetermined magnitude from a direct current source, and a circuit controlling the magnitude of current flow through the coil from the direct current source, said circuit comprising a set of contacts moved by the armature from a circuit closing position to a circuit opening position during the movement of the armature from the first to the second position and connected in a circuit between the source and the coil for completing the circuit between the source and the coil when the armature is at the first position and interrupting the circuit when the armature is at the second position, a first resistor connected in parallel with the contacts for reducing the current flow through the coil when the contacts are in a circuit opening position to a second predetermined value and means including a second resistor and a capacitor connected in series with the contacts and in parallel with the coil for supplying the coil with current energy when the contacts initially move from the circuit closing to the circuit opening position.

2. The combination as recited in claim 1 wherein the circuit controlling the magnitude of current flow through the coil includes a full wave bridge rectifier having input terminals connected to the source through the contacts and first resistor and output terminals connected to the capacitor and the coil.

3. The combination as recited in claim 2 wherein the rectifier includes diodes which are polarized so the output terminals have a predetermined polarity.

4. The combination as recited in claim 1 wherein the first resistor is a thick film type and is mounted between the rear side of the support and a front surface of a panel when the device is mounted on the panel.

5. The combination as recited in claim 4 wherein the means for mounting the resistor includes a metal plate that has a front surface mounted adjacent the rear surface of the support and the resistor is attached to the front surface of the plate by an adhesive.

6. The combination as recited in claim 1 wherein the device includes additional switching contacts which are moved by the armature to circuit changing positions and the additional switching contacts are moved to their respective circuit changing positions prior to the movement of the set of switching contacts to the circuit opening position during the movement of the armature from the first to the second position.

7. In a direct current electromagnetically operated device, the combination comprising: a metal support having a rear side and a front side, an electromagnet positioned on the front side of the support, said electromagnet including a laminated magnet iron magnet, a laminated magnet iron armature and a coil winding positioned on the magnet to induce a magnet flux in the magnet and the armature for causing the armature to move from a first position where the armature is spaced from the magnet to a second position where the armature engages the magnet when the coil is energized by direct current having a predetermined magnitude from a direct current source, and a circuit controlling the magnitude of current flow through the coil from the direct current source, said circuit comprising a set of contacts moved by the armature from a circuit closing position to a circuit opening position during the movement of the armature from the first to the second position and connected in a circuit between the source and the coil for completing the circuit between the source and the coil when the armature is at the first position and interrupting the circuit when the armature is at the second position, a thick film type resistor connected in parallel with the contacts for reducing the current flow through the coil when the contacts are in a circuit opening position to a second predetermined value, and means for mounting the resistor between the rear side of the support and a front side of a mounting panel for the device whereby the panel aids in dissipating heat generated by the resistor when the device is mounted on the panel and the contacts are in the circuit opening position.

8. The combination as recited in claim 7 wherein the means for mounting the resistor includes a metal plate that has a front surface mounted adjacent the rear surface of the support and the resistor is attached to the front surface of the plate by an adhesive.

9. The combination as recited in claim 7 wherein the device includes additional switching contacts which are moved by the armature to circuit changing positions and the additional switching contacts are moved to their respective circuit changing positions prior to the movement of the set of switching contacts to the circuit opening position during the movement of the armature from the first to the second position.

10. The combination as recited in claim 7 wherein the circuit controlling the magnitude of current flow through the coil includes a full wave bridge rectifier having input terminals connected to the source through the contacts and first resistor and output terminals connected to the capacitor and the coil.

* * * * *